US012480852B2

(12) United States Patent
Jin et al.

(10) Patent No.: US 12,480,852 B2
(45) Date of Patent: Nov. 25, 2025

(54) PRETENSION AND TENSILE IMPACT TEST APPARATUS CAPABLE OF SIMULATING FULL-SEA-DEPTH ENVIRONMENT

(71) Applicant: HUNAN UNIVERSITY OF SCIENCE AND TECHNOLOGY, Xiangtan (CN)

(72) Inventors: Yongping Jin, Xiangtan (CN); Fenfei Peng, Xiangtan (CN); Deshun Liu, Xiangtan (CN)

(73) Assignee: HUNAN UNIVERSITY OF SCIENCE AND TECHNOLOGY, Hunan (CN)

( * ) Notice: Subject to any disclaimer, the term of this patent is extended or adjusted under 35 U.S.C. 154(b) by 388 days.

(21) Appl. No.: 18/314,635

(22) Filed: May 9, 2023

(65) Prior Publication Data
US 2023/0273104 A1     Aug. 31, 2023

(30) Foreign Application Priority Data

Feb. 1, 2023   (CN) .......................... 202310049160.4

(51) Int. Cl.
  *G01N 3/307*   (2006.01)
  *G01N 3/06*    (2006.01)
(52) U.S. Cl.
  CPC ............. *G01N 3/307* (2013.01); *G01N 3/066* (2013.01); *G01N 2203/001* (2013.01); *G01N 2203/0044* (2013.01); *G01N 2203/0067* (2013.01)

(58) Field of Classification Search
  CPC .. G01N 3/307; G01N 3/066; G01N 2203/001; G01N 2203/0044; G01N 2203/0067; G01N 2203/0017; G01N 2203/0232
  See application file for complete search history.

(56) References Cited

U.S. PATENT DOCUMENTS

2022/0128442 A1* 4/2022 Zhou ...................... G01N 3/317

FOREIGN PATENT DOCUMENTS

| CN | 110196198 A | * | 9/2019 | ............... G01N 3/32 |
| CN | 110398427 A |   | 11/2019 | |
| CN | 110966951 A |   | 4/2020 | |

* cited by examiner

*Primary Examiner* — Timothy P Graves

(57) ABSTRACT

A pre-tension and tensile impact test apparatus capable of simulating a full-sea-depth environment includes a pre-tensioning device, a Hopkinson bar device, a seawater pressure simulation device, a power source group and an acquisition control unit. The Hopkinson bar device includes an input rod, an air compressing device, a test sample and an output rod. The pre-tensioning device, the input rod, the air compressing device, the seawater pressure simulation device, the test sample and the output rod are successively arranged on the same axis. The air compressing device includes an air cylinder, an end cover and an impact piston. Two ends of the air cylinder are each provided with the end cover. The impact piston and the air cylinder are in clearance fit. The input rod is coaxially connected to the impact piston. Two ends of the input rod each extend out of the end cover.

6 Claims, 5 Drawing Sheets

PRETENSION AND TENSILE IMPACT TEST APPARATUS CAPABLE OF SIMULATING FULL-SEA-DEPTH ENVIRONMENT

CROSS-REFERENCE TO RELATED APPLICATIONS

This application claims the benefit of priority from Chinese Patent Application No. 202310049160.4, filed on Feb. 1, 2023. The content of the aforementioned application, including any intervening amendments thereto, is incorporated herein by reference in its entirety.

TECHNICAL FIELD

The present application relates to static and dynamic mechanical test of materials, and more particularly to a pretension and tensile impact test apparatus capable of simulating a full-sea-depth environment.

BACKGROUND

With the increasing depletion of land resources, more and more attention has been paid to the exploration and development of marine resources, and a variety of exploration tools have been developed and applied to the practical exploration. The existing exploration equipment, such as submersible and underwater rig, is often moored or towed by cables. With the increase in the exploration depth, the length of the cable and the pressure of seawater on the cable are also increasing. When the exploration equipment reaches a certain depth, the dynamic behavior of the cable will become extremely complex. The cable is not only subject to complex dynamic and static loading (such as the equipment weight), but also subject to the increasing pressure with the increase in depth. For a better understanding of dynamic characteristics of the cable, it is necessary to study the dynamic mechanical properties. As a commonly used mechanical property testing device, the Hopkinson bar device plays an important role in dynamic mechanical testing (e.g., test of dynamic tensile property, dynamic compressive property, and dynamic torsional property) of metals, rocks, concrete and high-performance fibers. The traditional Hopkinson bar devices are generally operated at normal temperature and pressure, and some Hopkinson bar devices are equipped with a pressure-confining device (≤50 MPa) and a heating device to simulate various test conditions. Unfortunately, the existing Hopkinson bar devices are mainly used for the dynamic mechanical testing, but less for static mechanical test such as static tensile, creep, and fracture tests, thus failing to simultaneously perform the dynamic and static mechanical test. Moreover, the existing Hopkinson bar devices are mainly applied to the mechanical property test under normal pressure or no more than 50 MPa, but less for high-pressure environment, especially ultra high-pressure environment (>50 MPa). With the growing emphasis on the marine resources, more and more exploration tools, such as underwater drilling rigs and submersibles, will be applied to the ocean and even the deep sea, and in this case, it is required to conduct static and dynamic mechanical tests of materials in the deep sea. Accordingly, it is urgent to develop a device that can simulate the deep-sea environment, and enables static and dynamic mechanical test under the deep-sea pressure.

SUMMARY

Accordingly, the present application provides a pretension and tensile impact test apparatus integrating the triaxial static-dynamic combined loading and the simulation of full-sea-depth environment, which is capable of performing static and dynamic tensile tests of materials under simulated deep-sea environment. This application can provide theoretical support for the application of materials in deep-sea high-pressure environment.

Technical solutions of this application are specifically described as follows.

This application discloses a pretension and tensile impact test apparatus capable of simulating a full-sea-depth environment, comprising:
  a pre-tensioning device;
  a Hopkinson bar device;
  a seawater pressure simulation device;
  a power source group; and
  an acquisition control unit;
  wherein the Hopkinson bar device comprises an input rod, an air compressing device, a test sample and an output rod; the pre-tensioning device, the input rod, the air compressing device, the seawater pressure simulation device, the test sample and the output rod are arranged in sequence on the same axis; the air compressing device comprises an air cylinder, an end cover and an impact piston; two ends of the air cylinder are each provided with the end cover; the impact piston is in clearance fit with the air cylinder; the input rod is coaxially connected to the impact piston; two ends of the input rod each extend out of the end cover; one end of the input rod is connected to the pre-tensioning device, and the other end of the input rod extends into the seawater pressure simulation device and is in clearance fit with a first circular hole on the seawater pressure simulation device; the output rod, the test sample and the input rod are coaxially arranged; a first end of the test sample is adhesively connected to the input rod, and a second end of the test sample is adhesively connected to the output rod; the test sample is provided inside the pressure seawater device; and an end of the output rod away from the input rod is fixed;
  the power source group is configured to drive the pre-tensioning device and the input rod to stretch the test sample; and
  the acquisition control unit comprises a computer, a first strain gauge and a second strain gauge; the first strain gauge is mounted on the input rod; the second strain gauge is mounted on the output rod; the first strain gauge and the second strain gauge are connected to the computer; and the computer is connected to the power source group.

In some embodiments, the pre-tensioning device comprises a magnetostrictive displacement sensor, a hydraulic cylinder, a piston, a piston rod, a locking ring and a tension sensor; the piston is provided inside the hydraulic cylinder; the magnetostrictive displacement sensor is provided on the piston; the piston is connected to the piston rod; an end of the piston rod extends out of the hydraulic cylinder; the end of the input rod connected to the pre-tensioning device is provided with a connecting hole; the end of the piston rod extending out of the hydraulic cylinder is provided in the connecting hole, and is provided with a flange; the locking ring is provided at the connecting hole; the tension sensor is arranged between the flange and the locking ring; and the magnetostrictive displacement sensor and the tension sensor are connected to the acquisition control unit.

In some embodiments, the input rod and the output rod are elastic rods having the same diameter.

In some embodiments, the seawater pressure simulation device comprises a first pressure vessel, a second pressure vessel, a clamp, an extensometer, a first sliding rod, a second sliding rod, a first cylindrical base, a second cylindrical base, a first compression spring and a second compression spring;
- the first pressure vessel and the second pressure vessel both have a box structure with an opening; the opening of the first pressure vessel is opposite to the opening of the second pressure vessel; and the first pressure vessel and the second pressure vessel are clamped together through the clamp;
- a center of a base plate of the first pressure vessel is provided with the first circular hole; a center of a base plate of the second pressure vessel is provided with a second circular hole; the first circular hole is in clearance fit with the input rod, and is sealed with the input rod; and the second circular hole is in clearance fit with the output rod, and is sealed with the output rod;
- an inner bottom surface of the first pressure vessel is fixedly provided with the first cylindrical base; an inner bottom surface of the second pressure vessel is fixedly provided with the second cylindrical base; the first cylindrical base is provided with a first cylindrical blind hole; the second cylindrical base is provided with a second cylindrical blind hole; the first compression spring is provided in the first cylindrical blind hole; the second compression spring is provided in the second cylindrical blind hole; and the first cylindrical blind hole and the second cylindrical blind hole are coaxial;
- the first sliding rod and the second sliding rod are coaxial; the first sliding rod and the second sliding rod are each provided with the extensometer; a first end of the first sliding rod is connected to a first end of the second sliding rod; a second end of the first sliding rod is inserted in the first cylindrical blind hole; and a second end of the second sliding rod is inserted in the second cylindrical blind hole; and
- the first pressure vessel or the second pressure vessel is provided with a water injection hole.

In some embodiments, the power source group comprises a first power source, a second power source and a third power source; a rod chamber of the hydraulic cylinder is provided with an oil feed hole; the first power source is connected to the oil feed hole; a side wall of the air cylinder is provided with an air feed hole; the air feed hole is located at a side of the impact piston facing toward the test simple; the second power source is connected to the air inlet; and the third power source is connected to the water injection hole, and is configured to inject seawater into the first pressure vessel or the second pressure vessel, and apply pressure to the seawater.

In some embodiments, the first power source comprises a first servo motor, a first overflow valve and a hydraulic pump; an output shaft of the first servo motor is connected to a rotating shaft of the hydraulic pump; an inlet of the hydraulic pump is connected to an oil tank; an outlet of the hydraulic pump is connected to the oil feed hole through a first pipe; a first temperature sensor and a first pressure sensor are provided on the first pipe; the first pipe is connected to the oil tank through a first overflow pipe; and the first overflow pipe is provided with the first overflow valve;
- the second power source comprises a second servo motor, a second overflow valve, a first 2-position 2-way directional valve, an air tank and an air pump; an output shaft of the second servo motor is connected to a rotating shaft of the air pump; an outlet of the air pump is connected to an inlet of an air inlet pipe through a first one-way valve; an outlet of the air inlet pipe is connected to an inlet of the air tank; an overflow port of the air tank is connected to the air inlet pipe through a second overflow pipe; the second overflow pipe is provided with the second overflow valve; an outlet of the air tank is connected to an air inlet of the first 2-position 2-way directional valve through an air outlet pipe; an air outlet of the first 2-position 2-way directional valve is connected to the air feed hole; and a first stop valve and a third overflow valve are arranged on the air outlet pipe;
- the third power source comprises a first water tank, a third servo motor, a 2-way water pump, a gas-liquid booster pump, a second temperature sensor, a second pressure sensor and an energy accumulator; the first water tank is configured to store the seawater; an output shaft of the third servo motor is connected to a rotating shaft of the 2-way water pump; a water inlet of the 2-way water pump is connected to the first water tank through a second pipe; a water inlet of a second water tank is connected to a first end of a communicating pipe through a third pipe; a connection between the first end of the communicating pipe and third pipe is connected to a water outlet of the 2-way water pump; a water outlet of the second water tank is connected to a second end of the communicating pipe through a fourth pipe;
- the communicating pipe is provided with a second stop valve; a third stop valve is provided the third pipe; a fourth stop valve is provided on the fourth pipe; a connection between the second end of the communicating pipe and the fourth pipe is connected to a water inlet of a flowmeter through a first outlet pipe; the first outlet pipe is provided with a pressure-relief valve; an inlet of the gas-liquid booster pump is connected to the first water tank through a fifth pipe, and is connected to the first outlet pipe through a sixth pipe; a fifth stop valve is provided on the fifth pipe; a sixth stop valve is provided on the sixth pipe; an outlet of the gas-liquid booster pump is connected to the water inlet of the flowmeter through a second output pipe; the second outlet pipe is connected to an inlet of a second 2-position 2-way directional valve through a seventh pipe; an outlet of the second 2-position 2-way directional valve is connected to the first water tank through an eighth pipe; the second outlet pipe is provided with a second one-way valve, the second pressure sensor and the second temperature sensor; and a water outlet of the flowmeter is connected to the water injection hole through a ninth pipe; and
- the first servo motor, the second servo motor, the third servo motor, the first temperature sensor, the first pressure sensor, the second temperature sensor and the second pressure sensor are connected to the acquisition control unit, respectively.

In some embodiments, the acquisition control unit further comprises a dynamic mechanical acquisition unit, an acquisition controller, a force display, and a temperature display; the dynamic mechanical acquisition unit comprises a strain amplifier and a dynamic strain indicator; an output end of the dynamic strain indicator is connected to the computer; an input end of the dynamic strain indicator is connected to an output end of the strain amplifier; and an input end of the strain amplifier is connected to the first strain gauge and the second strain gauge; and
- an output port of the acquisition controller is connected to the computer, an input end of a first drive, an input end of a second drive and an input end of a third drive; an input port of the acquisition controller is connected to an output end of the temperature display, an output end of the force display, an output end of the extensometer and an output end of a pressure relay; an output end of the first drive is connected to the first servo motor; an output end of the second drive is connected to the second servo motor; an output end of the third drive is connected to the third servo motor; an input end of the temperature display is connected to the first temperature sensor and the second temperature sensor; an input end of the force display is connected to the tension sensor, the first pressure sensor and the second pressure sensor; and the pressure relay is connected to the second 2-position 2-way directional valve.

Compared to the prior art, this application has the following beneficial effects.

(1) The pre-tension and tensile impact test apparatus provided herein can perform static mechanical tensile test and dynamic and failure characteristic test at a high strain rate of $10^{-2}$-$10^{-4}$ s$^{-1}$, separately. Moreover, by means of the integration of the pre-tensioning device, the Hopkinson bar device and the acquisition control unit, it can also perform the test of dynamic mechanical characteristics and failure characteristic under pre-loading.

(2) By means of the seawater pressure simulation device, the static/dynamic tensile test can be performed in a pressure range of 0-140 MPa, obtaining mechanical properties of materials within a range from low pressure to high pressure, and even to ultra-high pressure.

(3) The test apparatus provided herein can perform the test of creep elongation and creep rupture under pressure (especially the long-time creep test under deep-sea high-pressure environment), and thus can be used to evaluate the influence of pressure on the creep performance. Therefore, this application is of great significance for the investigation of mechanical properties and failure characteristics of materials under ultra-high pressure.

Figure 1:
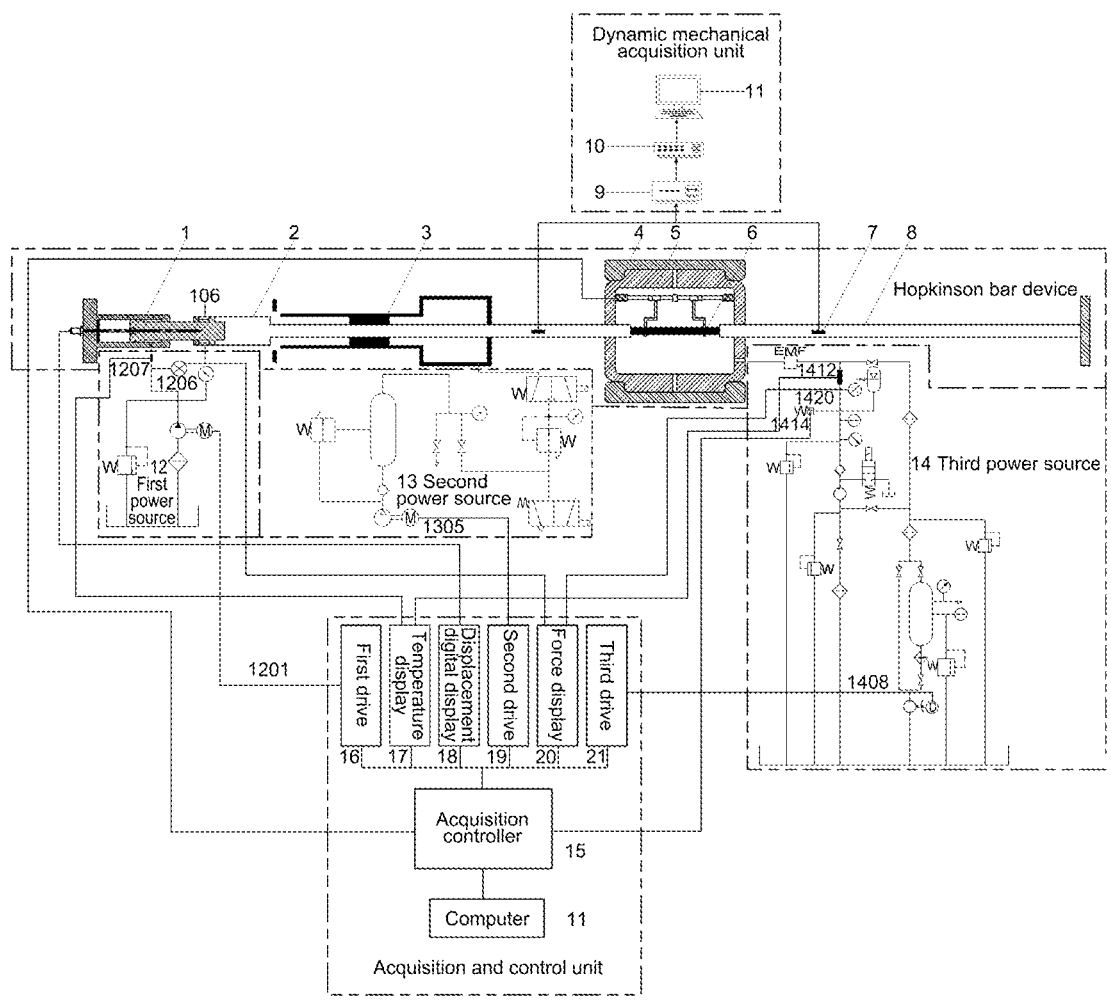
FIG. 1 schematically depicts a pretension and tensile impact test apparatus capable of simulating a full-sea-depth environment according to an embodiment of the present disclosure.

In the drawings: 1, pre-tensioning device; 2, input rod; 3, air compressing device; 4, high-pressure seawater simulation device; 5, high pressure-resistant extensometer; 6, test sample; 7, strain gauge; 8, output rod; 9, strain amplifier; 10, dynamic strain indicator; 11, computer; 12, first power source; 13, second power source; 14, third power source; 15, acquisition controller; 16, first drive; 17, temperature display; 18, displacement digital display; 19, second drive; 20, force display; and 21, third drive.

DETAILED DESCRIPTION OF EMBODIMENTS

The present disclosure will be described below in detail with reference to the embodiments and accompanying drawings.

Referring to FIG. 1, a pretension and tensile impact test apparatus capable of simulating a full-sea-depth environment includes a pre-tensioning device 1, a Hopkinson bar device, a high-pressure seawater simulation device 4, an acquisition control unit and a power source group. The Hopkinson bar device includes an input rod 2, an air compressing device 3, a test sample 6, multiple strain gauges 7 and an output rod 8 arranged from left to right. The pre-tensioning device 1, the input rod 2, the air compressing device 3, the high-pressure seawater simulation device 4, the test sample 6 and the output rod 8 are arranged in sequence on the same axis.

Figure 2:
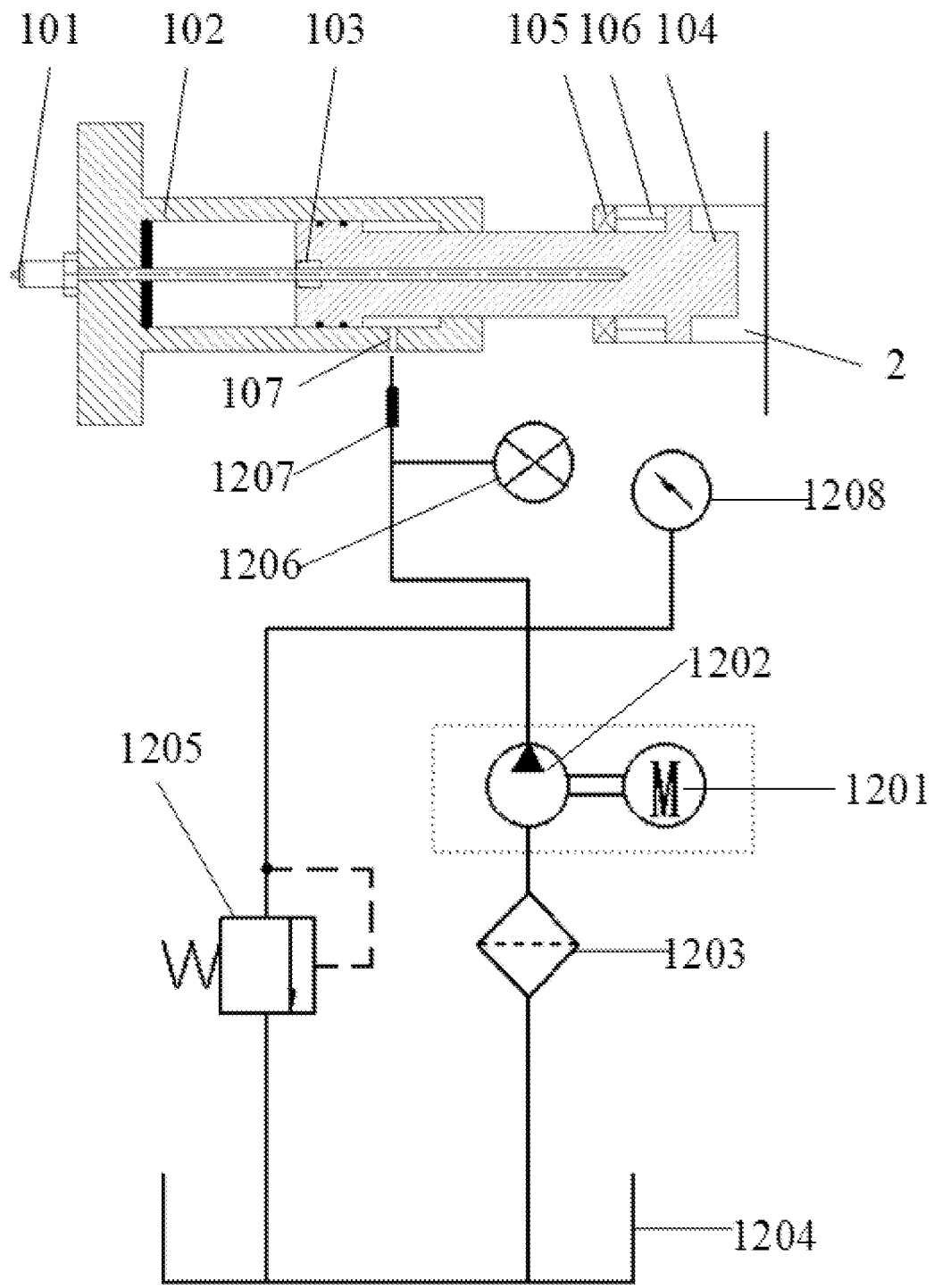
FIG. 2 schematically depicts a pre-tensioning device according to an embodiment of the present disclosure.

Referring to FIG. 2, the pre-tensioning device 1 includes a magnetostrictive displacement sensor 101, a hydraulic cylinder 102, a piston 103, a piston rod 104, a locking ring 105 and a tension sensor 106. The piston 103 is provided inside the hydraulic cylinder 102. The magnetostrictive displacement sensor 101 is provided on the piston 103. The piston 103 is connected to the piston rod 104. An end of the piston rod 104 extends out of the hydraulic cylinder 102, and is connected to the input rod 2 of the Hopkinson bar device. An end of the input rod 2 facing to the pre-tensioning device 1 is provided with a connecting hole. The end of the piston rod 104 extending out of the hydraulic cylinder 102 is provided in the connecting hole, and is provided with a flange. The locking ring 105 is provided at the connecting hole. The tension sensor 106 is arranged between the flange and the locking ring 105. The magnetostrictive displacement sensor 101 is connected to an input end of a displacement digital display 18. The displacement digital display 18 is connected to an acquisition controller 15 of the acquisition control unit. A rod chamber of the hydraulic cylinder 102 is provided with an oil feed hole 107. The oil feed hole 107 is configured to feed oil to provided hydraulic pressure.

Figure 3:
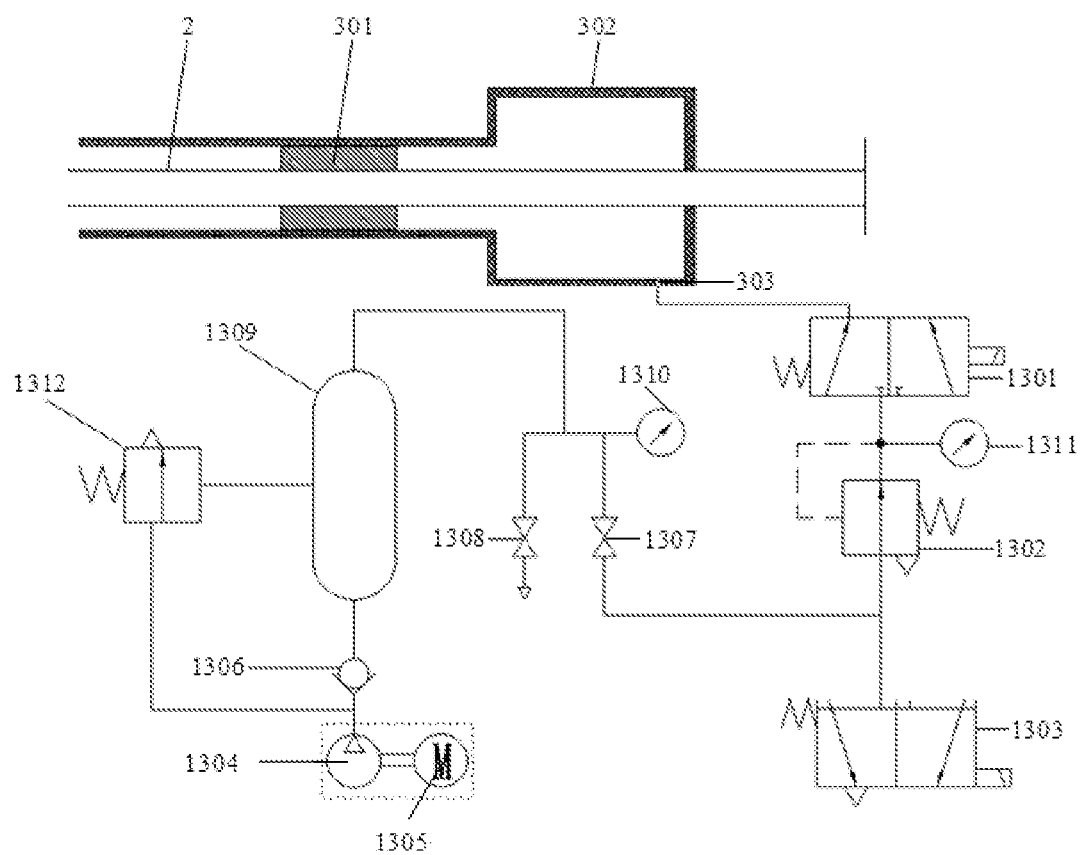
FIG. 3 schematically depicts a Hopkinson bar device and an air compressing device according to an embodiment of the present disclosure.
Figure 4:
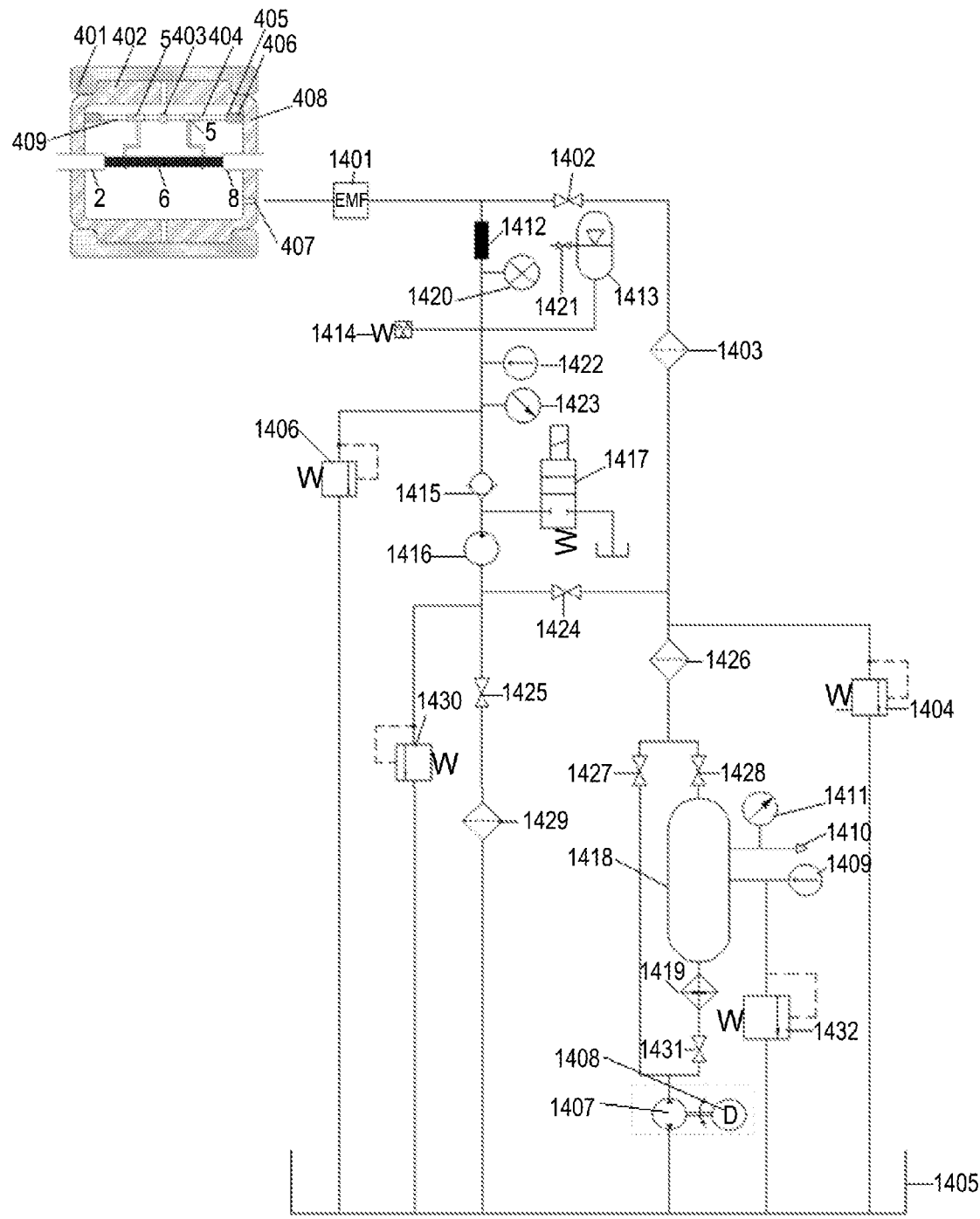
FIG. 4 schematically depicts a high-pressure seawater simulation device according to an embodiment of the present disclosure.

Referring to FIG. 4, the Hopkinson bar device includes the input rod 2, the air compressing device 3, the test sample 6 and the output rod 8. Referring to FIG. 3, the air compressing device 3 includes an impact piston 301, an air cylinder 302 and an end cover. Two ends of the air cylinder 302 are each provided with the end cover. The impact piston 301 is in clearance fit with the air cylinder 302. The air cylinder 302 is provided with an air feed hole 303. The air feed hole 303 is arranged at a side of the impact piston 301 facing toward the test simple. A cross section of the impact piston 301 is a circular ring. The input rod 2 is provided in a central through hole of the impact piston 301, and is coaxially connected to the impact piston 301. Two ends of the input rod 2 each extend out of the end cover. One end of the input rod 2 is connected to the piston rod 104 of the pre-tensioning device 1, and the other end of the input rod 2 extends into the high-pressure seawater simulation device 4 and is in clearance fit with a first circular hole on the high-pressure seawater simulation device 4. The output rod 8, the test sample 6 and the input rod 2 are coaxially arranged. A first end of the test sample 6 is adhesively connected to the input rod 2, and a second end of the test sample 6 is adhesively connected to the output rod 8. The test sample 6 is provided inside the high-pressure seawater simulation device 4. An end of the output rod 8 away from the input rod the input rod 2 is fixed. The input rod 2 and the output rod 8 are respectively attached with a strain gauge 7.

Referring to FIG. 4, the high-pressure seawater simulation device 4 includes a first high-pressure vessel 402, a second high-pressure vessel 408, a clamp 401, a high pressure-resistant extensometer 5, a first sliding rod 404, a second sliding rod 409, two cylindrical bases 405 and two compression springs 406. The first high-pressure vessel 402 and the second high-pressure vessel 408 both have a box structure with an opening. The openings of the first high-pressure vessel 402 and the second high-pressure vessel 408 are opposite to each other. The first high-pressure vessel 402 and the second high-pressure vessel 408 are clamped together through the clamp 401. A center of a base plate of the first high-pressure vessel 402 is provided with the first circular hole. A center of a base plate of the second high-pressure vessel 408 is provided with a second circular hole. The first circular hole is in clearance fit with the input rod 2, and sealed with the input rod 2. The second circular hole is in clearance fit with the output rod 8, and sealed with the output rod 8. Inner bottom surfaces of the first high-pressure vessel 402 and the second high-pressure vessel 408 are each provided with the cylindrical base 405. The two cylindrical bases 405 are each provided with a cylindrical blind hole. Each cylindrical blind hole is provided with the compression spring 406. The cylindrical blind holes on the cylindrical bases 405 are coaxial. The first sliding rod 404 and the second sliding rod 409 are coaxial. The first sliding rod 404 and the second sliding rod 409 are each provided with the high pressure-resistant extensometer 5. A first end of the first sliding rod 404 is connected to a first end of the second sliding rod 409 through a joint 403. A second end of the first sliding rod 404 is inserted in the cylindrical blind hole of the first high-pressure vessel 402. A second end of the second sliding rod 409 is inserted in the cylindrical blind hole of the second high-pressure vessel 408. The second high-pressure vessel 408 is provided with a high-pressure water injection hole 407.

The power source group includes a first power source 12, a second power source 13 and a third power source 14. The first power source 12 includes a first servo motor 1201, a first overflow valve 1205 and a hydraulic pump 1202. An output shaft of the first servo motor 1201 is connected to a rotating shaft of the hydraulic pump 1202. An inlet of the hydraulic pump 1202 is connected to an oil tank 1204 through a first pipe. The first pipe is provided with a first filter valve 1203. An outlet of the hydraulic pump 1202 is connected to the oil feed hole 107 through a second pipe. The second pipe is provided with a first temperature sensor 1207, a first pressure sensor 1206 and a first pressure gauge 1208. The second pipe is connected to the oil tank 1204 through a first overflow pipe. The first overflow pipe is provided with the first overflow valve 1205. The first power source 12 is configured to drive the piston 103 to move. A displacement of the piston 103 is acquired by the magnetostrictive displacement sensor 101 on the piston 103, transmitted to the acquisition controller 15, and displayed on a computer 11 in real time. A pressure is obtained by reading the first pressure gauge 1208.

The second power source 13 includes a second servo motor 1305, a second overflow valve 1312, a first 2-position 2-way directional valve 1301, a second 2-position 2-way directional valve 1303, an air tank 1309 and an air pump 1304. An output shaft of the second servo motor 1305 is connected to a rotating shaft of the air pump 1304. An outlet of the air pump 1304 is connected to an inlet of an air inlet pipe through a first one-way valve 1306. An outlet of the air inlet pipe is connected to an inlet of the air tank 1309. An overflow port of the air tank 1309 is connected to the air inlet pipe through a second overflow pipe. The second overflow pipe is provided with the second overflow valve 1312. An outlet of the air tank 1309 is connected to an air inlet of the first 2-position 2-way directional valve 1301 through an air outlet pipe. An air outlet of the first 2-position 2-way directional valve 1301 is connected to the air feed hole 303. A first stop valve 1307 and a seventh overflow valve 1302 are arranged in sequence on the air outlet pipe. A pressure-relief pipe and a fourth pressure gauge 1310 are arranged on the air outlet pipe, and between the air tank 1309 and the first stop valve 1307. The pressure-relief pipe is provided with a seventh stop valve 1308. A section between the first stop valve 1307 and the seventh overflow valve 1302 of the air outlet pipe is connected with an air inlet of the second 2-position 2-way directional valve 1303 through a pipe. A pipe arranged between the seventh overflow valve 1302 and the first 2-position 2-way directional valve 1301 is provided with a second pressure gauge 1311. The seventh stop valve 1308 is configured for pressure relief. The second 2-position 2-way directional valve 1303 is further configured for circuit pressure maintenance and emergency pressure relief.

The third power source 14 includes a first water tank 1405, a third servo motor 1408, a low-pressure 2-way water pump 1407, a gas-liquid booster pump 1416, a second temperature sensor 1412, a second pressure sensor 1420 and an energy accumulator 1413. The first water tank 1405 is configured to store seawater. An output shaft of the third servo motor 1408 is connected to a rotating shaft of the low-pressure 2-way water pump 1407. A water inlet of the low-pressure 2-way water pump 1407 is connected to the first water tank 1405 through a channel.

A water inlet of a second water tank 1418 is connected to a first end of a communicating pipe through a third pipe. A connection between the first end of the communicating pipe and third pipe is connected to a water outlet of the low-pressure 2-way water pump 1407. The communicating pipe is provided with a second stop valve 1427. The third pipe is provided with a third stop valve 1431 and a heating device 1419. A water outlet of the second water tank 1418 is connected to a second end of the communicating pipe through a fourth pipe. The fourth pipe is provided with a fourth stop valve 1428. An overflow port of the second water tank 1418 is connected to the first water tank 1405 through a third overflow pipe. The third overflow pipe is provided with a third overflow valve 1432. A first temperature gauge 1409 is arranged on third overflow pipe, and between the third overflow valve 1432 and the second water tank 1418. A breather pipe 1410 is arranged on the second water tank 1418. The breather pipe 1410 is provided with a fourth pressure gauge 1411. The breather pipe 1410 is located above the third overflow valve 1432.

A connection between the second end of the communicating pipe and the fourth pipe is connected to a water inlet of a flowmeter through a first outlet pipe. The first outlet pipe is provided with a pressure-relief valve 1402, a second filter valve 1403 and a third filter valve 1426 arranged in sequence on the first outlet pipe. The third filter valve 1426 is closer to the second water tank 1418 compared to the pressure-relief valve 1402 and the second filter valve 1403. An inlet of the gas-liquid booster pump 1416 is connected to the first water tank 1405 through a fifth pipe, and connected to the first outlet pipe through a sixth pipe. The fifth pipe is provided with a fifth stop valve 1425 and a fourth filter valve 1429. The sixth pipe is provided with a sixth stop valve 1424. An outlet of the gas-liquid booster pump 1416 is connected to the water inlet of the flowmeter 1401 through a second outlet pipe. The second outlet pipe is provided with a second one-way valve 1415, a third pressure gauge 1423, a second temperature gauge 1422, the second pressure sensor 1420 and the second temperature sensor 1412 arranged in sequence. The second outlet pipe is communicated with the first water tank 1405 through a fourth overflow pipe. The fourth overflow pipe is provided with a fourth overflow valve 1406. A section of the first outlet pipe between the second filter valve 1403 and the third filter valve 1426 is communicated with the first water tank 1405 through a fifth overflow pipe. The fifth overflow pipe is provided with a fifth overflow valve 1404. A section between the pipe connecting the gas-liquid booster pump 1416 and the first water tank 1405 of the pipe connecting the gas-liquid booster pump 1416 and the first water tank 1405 is connected to the first water tank 1405 through a sixth overflow pipe. The sixth overflow pipe is provided with a sixth overflow valve 1430. A section between the gas-liquid booster pump 1416 and the second one-way valve 1415 of the second outlet pipe is connected to an inlet of a third 2-position 2-way directional valve 1417 through a pipe. An outlet of the third 2-position 2-way directional valve 1417 is connected to the first water tank 1405 through a pipe.

The acquisition control unit includes a dynamic mechanical acquisition unit, an acquisition controller 15, a force displayer 20, a temperature displayer 17, a displacement digital displayer 18, a first drive 16, a second drive 19, a third drive 21 and a computer 11. The dynamic mechanical acquisition unit includes a strain amplifier 9 and a dynamic strain indicator 10. An output end of the dynamic strain indicator 10 is connected to the computer 11. An input end of the dynamic strain indicator 10 is connected to an output end of the strain amplifier 9. An input end of the strain amplifier 9 is connected to the strain gauge 7. The dynamic strain indicator 10 is configured to collect information under strain rate of $10^{-1}$-$10^{-4}$ s$^{-1}$.

An output port of the acquisition controller 15 is connected to the computer 11, an input end of the first drive 16, an input end of the second drive 19 and an input end of the third drive 21, respectively. An input port of the acquisition controller 15 is connected to an output end of the temperature displayer 17, an output end of the displacement digital displayer 18, output ends of the two high pressure-resistant extensometer 5, an output end of the force displayer 20 and an output end of a pressure relay 1414. An output end of the first drive 16 is connected to the first servo motor 1201. An output end of the second drive 19 is connected to the second servo motor 1305. An output end of the third drive 21 is connected to the third servo motor 1408. An input end of the temperature displayer 17 is connected to the first temperature sensor 1207 and the second temperature sensor 1412. An input end of the displacement digital displayer 18 is connected to the magnetostrictive displacement sensor 101 and the two high pressure-resistant extensometer 5. An input end of the force displayer 20 is connected to the tension sensor 106, the first pressure sensor 1206 and the second pressure sensor 1420. The pressure relay 1414 is connected to the third 2-position 2-way directional valve 1417.

A first boosting mode of the third power source 14 is not related to temperature change. The seawater in the first water tank 1405 successively flows through the fourth filter valve 1429, the fifth stop valve 1425, the gas-liquid booster pump 1416 and the second one-way valve 1415, so as to elevate the pressure in the first high-pressure vessel 402. When the pressure in the first high-pressure vessel 402 reaches a desired level, information is fed to the acquisition controller 15 by the third pressure gauge 1423 and the second pressure sensor 1420, and then transmitted to the computer 11. The pressure relay 1414 is controlled by the computer 11 to emit a signal to make the third 2-position 2-way directional valve 1417 to change a way, such that the third servo motor 1408 is controlled to drive the gas-liquid booster pump 1416 to unload, and the energy accumulator 1413 is configured to maintain the pressure. Upon completing a test, the sixth stop valve 1424, the fourth stop valve 1428 and the third stop valve 1431 are closed. The pressure-relief valve 1402 is opened to relieve pressure. After the pressure relief, the second stop valve 1427 is opened. The acquisition controller 15 is controlled by the computer to drive the third drive 21 to control the third servo motor 1408, and the third servo motor 1408 drives the low-pressure 2-way water pump 1407 to reverse, such that the seawater flows through the pressure-relief valve 1402, the second filter valve 1403, and the third filter valve 1426 to enter the first water tank 1405.

A second boosting mode of the third power source 14 is related to temperature change. The third servo motor 1408 drives the low-pressure 2-way water pump 1407 to send the seawater in the first water tank 1405 to the first high-pressure vessel 402 by successively passing through the second stop valve 1427, the sixth stop valve 1424, the gas-liquid booster pump 1416, the second one-way valve 1415, the third pressure gauge 1423, the second temperature gauge 1422, the second pressure sensor 1420, the second temperature sensor 1412 and the electromagnetic flowmeter 1401. In addition, the seawater can be injected into the first high-pressure vessel 402 by successively passing through the third stop valve 1431, the heating device 1419, the second water tank 1418, the sixth stop valve 1424 and the gas-liquid booster pump 1416, in which the seawater is heated by the heating device 1419. Consequently, hot and cold seawater can be mixed and injected. Upon completing the test, the low-pressure 2-way water pump 1407 can be reversed to pump the seawater out of the first water tank 1405 after pressure relief. The second temperature sensor 1412 is configured to detect a temperature in the first high-pressure vessel 402. The second pressure sensor 1420 is configured to detect a pressure in the first high-pressure vessel 402. The temperature displayer 17 receives a signal from the second temperature sensor 1412. The force displayer 20 receives a signal from the second pressure sensor 1420. The third servo motor 1408 is controlled by the acquisition controller 15 to control the gas-liquid booster pump 1416 for pressure and temperature maintenance. The electromagnetic flowmeter 1401 is configured to detect a flow into the first high-pressure vessel 402 and a flow out of the first high-pressure vessel 402, so as to obtain a difference. The second temperature gauge 1422 is configured to detect the temperature in pipes in real time. The third pressure gauge 1423 is configured to detect the pressure in pipes in real time. The energy accumulator 1413 is configured to prevent the first high-pressure vessel 402 from pulsation under impact, such that the pressure in the first high-pressure vessel 402 is maintained. When the pressure reaches a desired pressure, the pressure relay 1414 emits a signal to make the third 2-position 2-way directional valve 1417 to change a way, and make the gas-liquid booster pump 1416 to unload. At this time, the energy accumulator 1413 is configured to maintain the pressure. The fourth overflow valve 1406 and the fifth overflow valve 1404 are configured to maintain the stability.

Provided is an example of static/dynamic mechanical test in ultra high-pressure environment (i.e., 12000 m sea depth).

Figure 5:
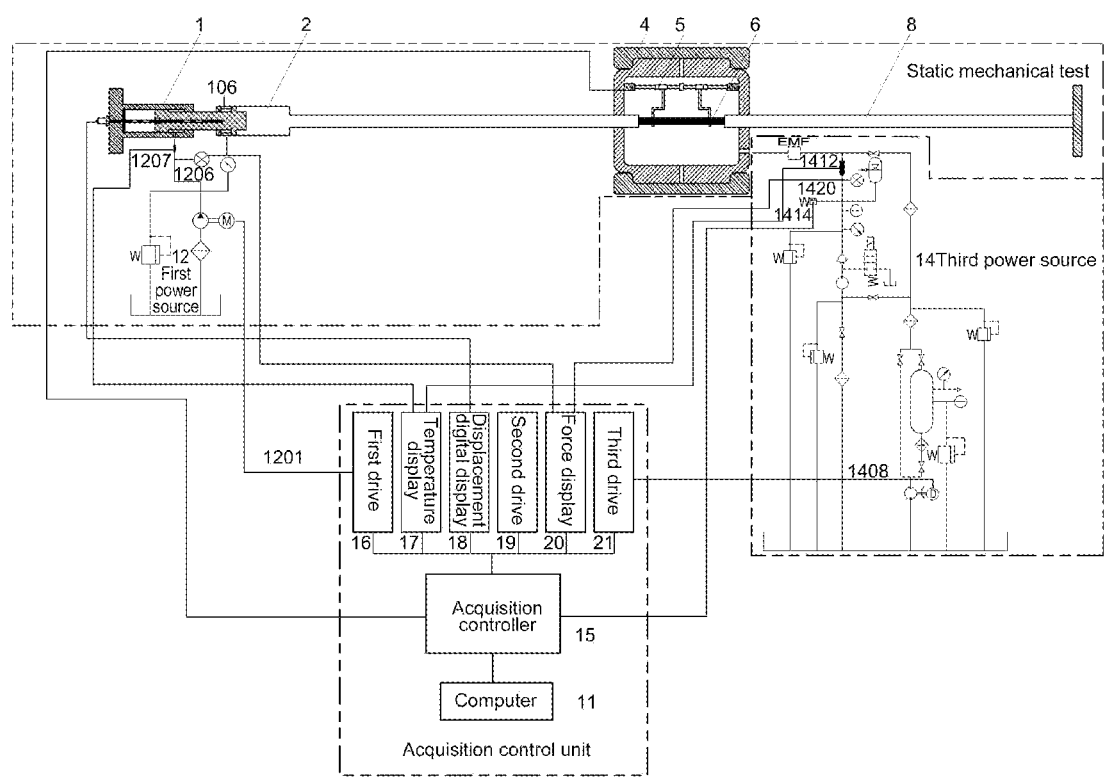
FIG. 5 schematically shows test principle of the pretension and tensile impact test apparatus according to an embodiment of the present disclosure.

Referring to FIG. 5, the test sample 6 is mounted. When a deep-sea pressure environment is required, the third servo motor 1408 is turned on to drive the gas-liquid booster pump 1416 to pump water into the high-pressure vessels until 120 MPa is displayed by the third pressure gauge 1423, that is, the pressure in the high-pressure vessels is 120 MPa, which simulates the 12000 m deep sea environment. The second pressure sensor 1420 and the second temperature sensor 1412 feed signals to the acquisition controller 15. The acquisition controller 15 makes the pressure relay 1414 to turn a way of the third 2-position 2-way directional valve 1417, such that the pressure in the high-pressure vessels is changed, thus simulating different deep-sea environments. When pressure relief is required, the pressure-relief valve 1402 is opened. When performs a static mechanical test in ultra high-pressure environment, the pre-tensioning device applies tension to the test sample 6. The acquisition controller 15 collects signals of the tension sensor 106 and the magnetostrictive displacement sensor 101, and transmits to the computer for data processing. When performs a long-time creep and fracture tests, the high pressure-resistant extensometer 5 mounted inside the high-pressure vessels is used to detect creep and fracture displacements. A tensile strength can be precisely controlled by the acquisition controller 15, in which the acquisition controller 15 controls the first servo motor 1201 to drive the hydraulic pump 1202.

Referring to FIG. 1, when performs a dynamic test in ultra-high pressure environment, the air compressing device 3 compresses air into the air cylinder 302, such that the impact piston 301 hits the input rod 2 to generate a tensile strain wave. The strain gauges 7 posted on the input rod 2 and the output rod 8 collect signals, the signals are amplified by the strain amplifier 9, transmitted to the dynamic strain indicator 10 and input into the computer for processing. For a dynamic test under pre-static loading, the first servo motor 1201 is turned on. A hydraulic medium is injected into the hydraulic cylinder 102 by the hydraulic pump 1202, such that the piston rod 104 is driven to move to put an axial pre-static loading on the test sample 6. The pre-static loading can be adjusted in real time. After applying the pre-static loading, the dynamic test can be performed. The impact piston 301 hits the input rod 2, such that the air compressing device 3 applies the dynamic loading ($10^{-2}$-$10^{-4}$ $s^{-1}$) to the test sample 6. The acquisition controller 15 and the dynamic strain indicator 10 allow a real-time feedback and display of dynamic test data under pre-static loading.

What is claimed is:

1. A pretension and tensile impact test apparatus capable of simulating a full-sea-depth environment, comprising:
a pre-tensioning device;
a Hopkinson bar device;
a seawater pressure simulation device;
a power source group; and
an acquisition control unit;
wherein the Hopkinson bar device comprises an input rod, an air compressing device, a test sample and an output rod; the pre-tensioning device, the input rod, the air compressing device, the seawater pressure simulation device, the test sample and the output rod are arranged in sequence on the same axis; the air compressing device comprises an air cylinder and an impact piston; the impact piston is in clearance fit with the air cylinder; the input rod is coaxially connected to the impact piston; one end of the input rod is connected to the pre-tensioning device, and the other end of the input rod extends into the seawater pressure simulation device and is in clearance fit with a first circular hole on the seawater pressure simulation device; the output rod, the test sample and the input rod are coaxially arranged; a first end of the test sample is adhesively connected to the input rod, and a second end of the test sample is adhesively connected to the output rod; the test sample is provided inside the seawater pressure simulation device; and an end of the output rod away from the input rod is fixed;
the power source group is configured to drive the pre-tensioning device and the input rod to stretch the test sample; and
the acquisition control unit comprises a computer, a first strain gauge and a second strain gauge; the first strain gauge is mounted on the input rod; the second strain gauge is mounted on the output rod; the first strain gauge and the second strain gauge are connected to the computer; and the computer is connected to the power source group;
wherein the pre-tensioning device comprises a magnetostrictive displacement sensor, a hydraulic cylinder, a piston, a piston rod, a locking ring and a tension sensor; the piston is provided inside the hydraulic cylinder; the magnetostrictive displacement sensor is provided on the piston; the piston is connected to the piston rod; an end of the piston rod extends out of the hydraulic cylinder; the end of the input rod connected to the pre-tensioning device is provided with a connecting hole; the end of the piston rod extending out of the hydraulic cylinder is provided in the connecting hole, and is provided with a flange; the locking ring is provided at the connecting hole; the tension sensor is arranged between the flange and the locking ring; and the magnetostrictive displacement sensor and the tension sensor are connected to the acquisition control unit.

2. The pretension and tensile impact test apparatus of claim 1, wherein the input rod and the output rod are elastic rods having the same diameter.

3. The pretension and tensile impact test apparatus of claim 2, wherein the seawater pressure simulation device comprises a first pressure vessel, a second pressure vessel, a clamp, an extensometer, a first sliding rod, a second sliding rod, a first cylindrical base, a second cylindrical base, a first compression spring and a second compression spring;
the first pressure vessel and the second pressure vessel both have a box structure with an opening; the opening of the first pressure vessel is opposite to the opening of the second pressure vessel; and the first pressure vessel and the second pressure vessel are clamped together through the clamp;
a center of a base plate of the first pressure vessel is provided with the first circular hole; a center of a base plate of the second pressure vessel is provided with a second circular hole; the first circular hole is in clearance fit with the input rod, and is sealed with the input rod; and the second circular hole is in clearance fit with the output rod, and is sealed with the output rod;
an inner bottom surface of the first pressure vessel is fixedly provided with the first cylindrical base; an inner bottom surface of the second pressure vessel is fixedly provided with the second cylindrical base; the first cylindrical base is provided with a first cylindrical blind hole; the second cylindrical base is provided with a second cylindrical blind hole; the first compression spring is provided in the first cylindrical blind hole; the second compression spring is provided in the second cylindrical blind hole; and the first cylindrical blind hole and the second cylindrical blind hole are coaxial; the first sliding rod and the second sliding rod are coaxial; the first sliding rod and the second sliding rod are each provided with the extensometer; a first end of the first sliding rod is connected to a first end of the second sliding rod; a second end of the first sliding rod is inserted in the first cylindrical blind hole; and a second end of the second sliding rod is inserted in the second cylindrical blind hole; and the first pressure vessel or the second pressure vessel is provided with a water injection hole.

4. The pretension and tensile impact test apparatus of claim 3, wherein the power source group comprises a first power source, a second power source and a third power source; a rod chamber of the hydraulic cylinder is provided with an oil feed hole; the first power source is connected to the oil feed hole; a side wall of the air cylinder is provided with an air feed hole; the air feed hole is located at a side of the impact piston facing toward the test simple; the second power source is connected to the air inlet; and the third power source is connected to the water injection hole, and is configured to inject seawater into the first pressure vessel or the second pressure vessel, and apply pressure to the seawater.

5. The pretension and tensile impact test apparatus of claim 4, wherein the first power source comprises a first servo motor, a first overflow valve and a hydraulic pump; an output shaft of the first servo motor is connected to a rotating shaft of the hydraulic pump; an inlet of the hydraulic pump is connected to an oil tank; an outlet of the hydraulic pump is connected to the oil feed hole through a first pipe; a first temperature sensor and a first pressure sensor are provided on the first pipe; the first pipe is connected to the oil tank through a first overflow pipe; and the first overflow pipe is provided with the first overflow valve;

the second power source comprises a second servo motor, a second overflow valve, a first 2-position 2-way directional valve, an air tank and an air pump; an output shaft of the second servo motor is connected to a rotating shaft of the air pump; an outlet of the air pump is connected to an inlet of an air inlet pipe through a first one-way valve; an outlet of the air inlet pipe is connected to an inlet of the air tank; an overflow port of the air tank is connected to the air inlet pipe through a second overflow pipe; the second overflow pipe is provided with the second overflow valve; an outlet of the air tank is connected to an air inlet of the first 2-position 2-way directional valve through an air outlet pipe; an air outlet of the first 2-position 2-way directional valve is connected to the air feed hole; and a first stop valve and a third overflow valve are arranged on the air outlet pipe;

the third power source comprises a first water tank, a second water tank, a third servo motor, a 2-way water pump, a gas-liquid booster pump, a second temperature sensor, a second pressure sensor and an energy accumulator; the first water tank is configured to store the seawater; an output shaft of the third servo motor is connected to a rotating shaft of the 2-way water pump; a water inlet of the 2-way water pump is connected to the first water tank through a second pipe; a water inlet of the second water tank is connected to a first end of a communicating pipe through a third pipe; a connection between the first end of the communicating pipe and third pipe is connected to a water outlet of the 2-way water pump; a water outlet of the second water tank is connected to a second end of the communicating pipe through a fourth pipe;

the communicating pipe is provided with a second stop valve; a third stop valve is provided on the third pipe; a fourth stop valve is provided on the fourth pipe; a connection between the second end of the communicating pipe and the fourth pipe is connected to a water inlet of a flowmeter through a first outlet pipe; the first outlet pipe is provided with a pressure-relief valve; an inlet of the gas-liquid booster pump is connected to the first water tank through a fifth pipe, and is connected to the first outlet pipe through a sixth pipe; a fifth stop valve is provided on the fifth pipe; a sixth stop valve is provided on the sixth pipe; an outlet of the gas-liquid booster pump is connected to the water inlet of the flowmeter through a second output pipe; the second outlet pipe is connected to an inlet of a second 2-position 2-way directional valve through a seventh pipe; an outlet of the second 2-position 2-way directional valve is connected to the first water tank through an eighth pipe; the second outlet pipe is provided with a second one-way valve, the second pressure sensor and the second temperature sensor; and a water outlet of the flowmeter is connected to the water injection hole through a ninth pipe; and the first servo motor, the second servo motor, the third servo motor, the first temperature sensor, the first pressure sensor, the second temperature sensor and the second pressure sensor are connected to the acquisition control unit, respectively.

6. The pretension and tensile impact test apparatus of claim 5, wherein the acquisition control unit further comprises a dynamic mechanical acquisition unit, an acquisition controller, a force display, and a temperature display; the dynamic mechanical acquisition unit comprises a strain amplifier and a dynamic strain indicator; an output end of the dynamic strain indicator is connected to the computer; an input end of the dynamic strain indicator is connected to an output end of the strain amplifier; and an input end of the strain amplifier is connected to the first strain gauge and the second strain gauge; and an output port of the acquisition controller is connected to the computer, an input end of a first drive, an input end of a second drive and an input end of a third drive; an input port of the acquisition controller is connected to an output end of the temperature display, an output end of the force display, an output end of the extensometer and an output end of a pressure relay; an output end of the first drive is connected to the first servo motor; an output end of the second drive is connected to the second servo motor; an output end of the third drive is connected to the third servo motor; an input end of the temperature display is connected to the first temperature sensor and the second temperature sensor; an input end of the force display is connected to the tension sensor, the first pressure sensor and the second pressure sensor; and the pressure relay is connected to the second 2-position 2-way directional valve.

* * * * *